No. 836,974. PATENTED NOV. 27, 1906.
F. HOLDEN.
METER.
APPLICATION FILED APR. 24, 1905.

2 SHEETS—SHEET 1.

WITNESSES
Burchard V. Kelley
Helen Oxford

INVENTOR
FRANK HOLDEN
ATTY.

No. 836,974. PATENTED NOV. 27, 1906.
F. HOLDEN.
METER.
APPLICATION FILED APR. 24, 1905.

2 SHEETS—SHEET 2.

Witnesses:

Inventor:
Frank Holden.
by Albert G. Davis
Att'y.

UNITED STATES PATENT OFFICE.

FRANK HOLDEN, OF RUGBY, ENGLAND, ASSIGNOR TO GENERAL ELECTRIC COMPANY, A CORPORATION OF NEW YORK.

METER.

No. 836,974.      Specification of Letters Patent.      Patented Nov. 27, 1906.

Application filed April 24, 1905. Serial No. 257,155.

*To all whom it may concern:*

Be it known that I, FRANK HOLDEN, a citizen of the United States, residing at Rugby, England, have invented certain new and useful Improvements in Meters, of which the following is a specification.

This invention relates to an electric meter for measuring the energy or a factor of the energy supplied to electric-translating devices.

More particularly, the invention relates to an instrument of the class known as "mercury-meters," in which the moving element is partly or wholly immersed in a bath of mercury.

One object of my invention is to provide a mercury-meter having a greater torque than those now in use, and I accomplish this by employing a plurality of armature-conductors on the moving element of the meter and means for interconnecting these conductors, so that the current flows through two or more of them in series, the field of the meter being arranged so that it will act effectively on the current in all the conductors so connected to produce a torque.

My invention will be better understood by reference to the following description, taken in connection with the accompanying drawings, which show the preferred embodiment of my invention.

Figure 1:
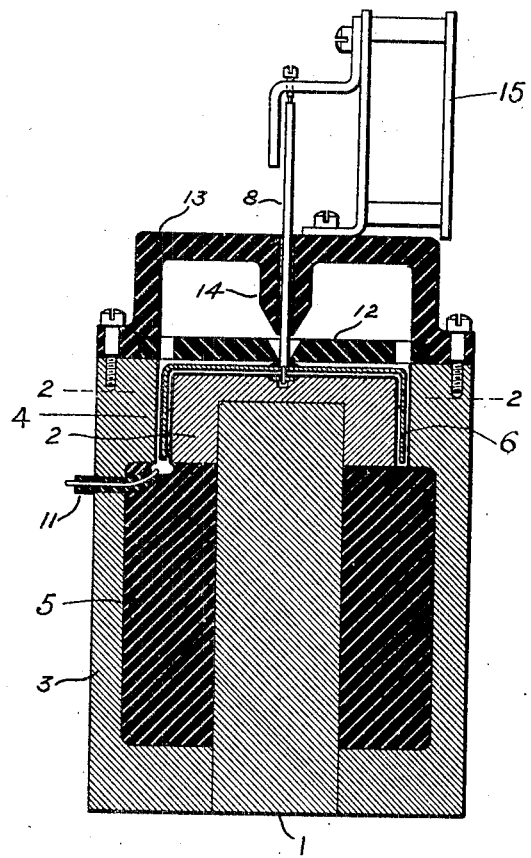
Figure 2:
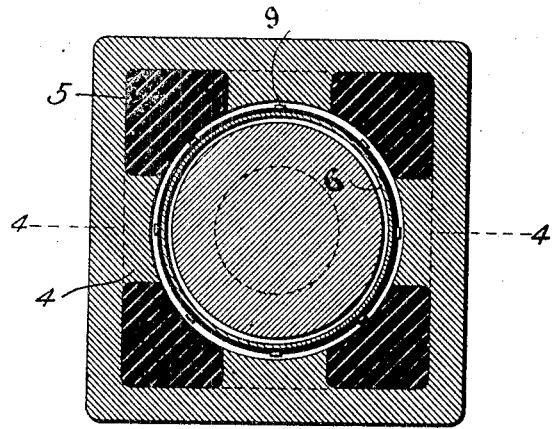
Figure 3:
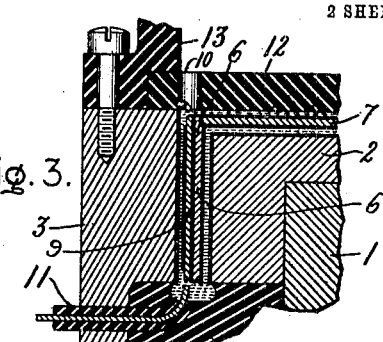
Figure 4:
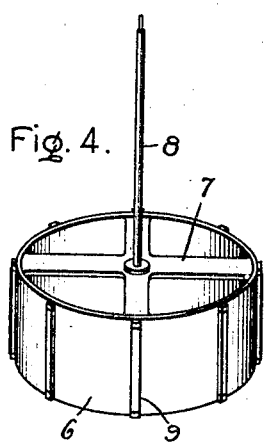
Figure 5:
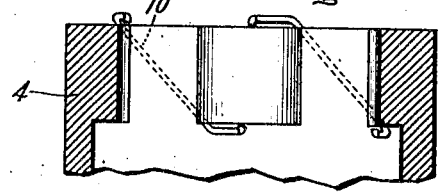
Figure 6:
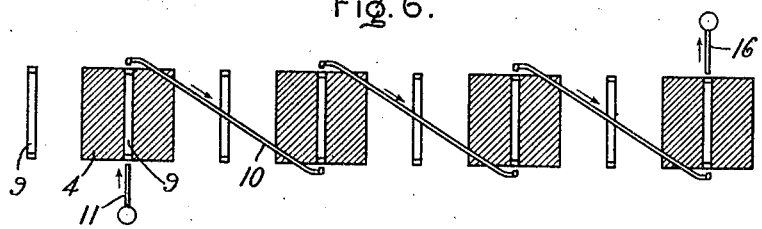
Figure 7:
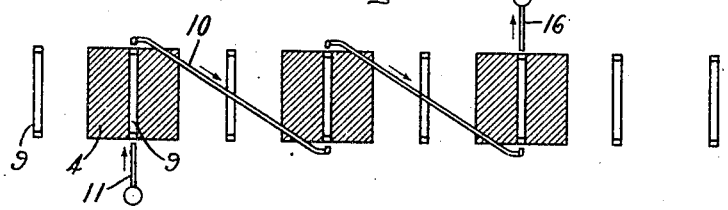
Figure 8:
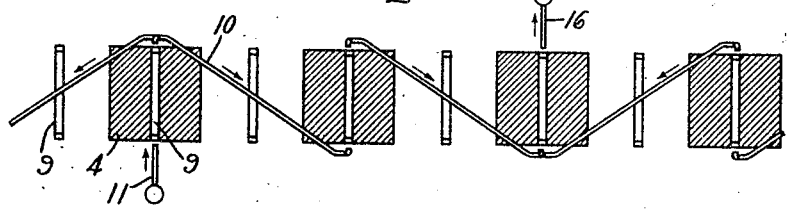

In the drawings, Figure 1 is a vertical section of the meter. Fig. 2 is a horizontal section on the line 2 2 of Fig. 1. Fig. 3 is a section through the mercury-chamber on an enlarged scale. Fig. 4 is a perspective view of the moving element. Fig. 5 is a sectional elevation of a portion of the magnet, the section being on line 4 4 of Fig. 2. Fig. 6 is a developed view showing the direction of current-flow in the conductors, and Figs. 7 and 8 are views similar to Fig. 6, showing modifications.

The novel features of my invention will be definitely indicated in the claims appended hereto.

Referring to the drawings, 1 indicates a cylindrical steel core permanently magnetized, to the upper end of which is secured a circular iron block 2, forming one pole of the magnet. The other end of the core 1 fits into the partially-closed end of a hollow steel magnet member 3. At the upper end of member 3 are a plurality of poles 4, projecting radially inward close to block 2, so that strong magnetic fields are established in the narrow gaps between the poles 4 and block 2. The spaces between the core 1 and the member 3 and between adjacent poles 4 are filled with insulating material 5, so that a narrow circular chamber is formed around the block 2. It will be seen that all the poles 4 are of the same polarity and the pole 2, common to all the poles 4, is of the opposite polarity, so that the field structure is homopolar—that is, a conductor moving around the narrow circular chamber would cut all the lines of force in the same direction. This is the type of magnetic-field structure I prefer to use; but some of the principles of my invention can be embodied in a meter employing a field-magnet structure having poles alternating in polarity, and therefore I do not wish to be understood as limited to any one type. The metal surfaces of the poles 2 and 4 forming the walls of the chamber are covered with a thin film of insulating material, as best shown in Fig. 3. This chamber is filled with mercury, and the moving element of the meter is immersed therein. This moving element consists of a light ring 6, of copper, aluminium, or other conducting material, completely insulated by a thin film of any suitable insulating material, as shown in Fig. 3, and supported on the insulated arms 7 of a spider secured to a spindle 8, mounted for rotation in bearings formed one on the top of the block 2 and the other in a stationary member mounted above the mercury-chamber. A weight may be fastened to the armature-spindle to offset the buoyancy of the armature in mercury.

Secured on the ring 6 parallel to the axis of the moving element and at equal distances from each other are a plurality of strips 9 of conducting material, forming the armature-conductors. These strips are arranged to be cross-connected, so that the current flows through two or more of them in series, thereby developing a large effective torque. I accomplish this by providing stationary conductors 10, set into the walls of the mercury-chamber, as indicated in Fig. 5, and arranged to carry the current from the end of a conductor 9 at the top of the mercury-chamber to the end of another conductor at the bottom of the chamber. Both the armature-conductors 9 and the stationary conductors 10 are completely insulated, except at the ends, and the mercury serves to conduct the current between the uninsulated ends or contact members of the moving and stationary conductors. The ends of the stationary conductors are bent over so as to be very close to the path of movement of the moving conductors in order that the current will have to pass through only a thin film of mercury. Current is led to the armature-conductors by an insulated conductor 11, extending through an opening in the member 3 to the bottom of the mercury-chamber, where it makes contact with the mercury directly under one of the magnet-poles. A similar insulated conductor leading into the mercury-chamber at the top at a point angularly displaced from the conductor 11 carries the current from the mercury-chamber.

Mounted directly above the moving element is a diaphragm 12, of insulating material or of non-magnetic metal, coated on its under side with an insulating-film. Secured to the member 3 and inclosing the diaphragm 12 is a cover 13, shaped so as to form a receptacle between it and the diaphragm. Depending from the under side of this cover is a tubular stem 14, through the opening of which the spindle 8 of the meter extends. Openings are provided through the diaphragm 12 at the center for the spindle 8 and also at the edges to permit the mercury to flow freely from the armature-chamber into the receptacle formed by the cover 13 and the diaphragm. With this construction it will be seen that as the under side of the diaphragm is very close to the moving element it serves to confine the mercury within the armature-chamber, so that when the meter is moved about surging is prevented, thereby avoiding any damage to the armature, which might result if free movement of the mercury were permitted. Also when the meter is tilted the mercury runs from the armature-chamber through the openings in diaphragm 12 into the receptacle formed by cover 13 and diaphragm 12; but the stem 14 is of such a length that even though all the mercury flows into this receptacle it will not rise to such a height therein as to allow any of it to flow out around the spindle 8 and be lost.

A dial-train 15 of any usual construction may be mounted on top of the cover 13 and geared to the spindle.

In the meter illustrated herein there are four poles 4 and eight armature-conductors 9. It must be understood, however, that the number of poles and the number of armature-conductors can be greater or less than this. The current is led to the armature-conductors by the lead 11 entering directly under one of the poles and out by a similar conductor 16 directly above an adjacent pole. When four of the armature-conductors 9 are at the centers of the four magnetic fields, the current flows through the four armature-conductors and the three stationary conductors 10 in series, as shown in Fig. 6. The poles 4 are all of the same polarity and the current flows in the same direction in all the conductors 9, so that there are four active conductors, developing a torque. When the moving element has turned one-eighth of a revolution, the other four conductors are brought into the centers of the fields and the current flows through them and the three stationary conductors 10 in series. The total turning effort is therefore greater than in the types of mercury-meters heretofore constructed in which the torque-producing current flows through the magnetic field only once. With this arrangement there is more or less leakage of current through the mercury, which tends to cut down the torque, and for this reason the mercury-chamber should be made as narrow as possible, allowing sufficient clearance for the moving parts, so that the width of the mercury, and hence the conductivity of the leakage path, shall be as small as possible. Also the ends of the stationary conductors should be arranged very close to the path of movement of the moving conductors in order to reduce as much as possible the amount of mercury through which the current flowing through the conductors 9 and 10 must pass. The greatest leakage is from the leading-in conductor 11 through the mercury direct to the leading-out conductor 16, as these conductors are located at adjacent poles; but the high resistance of mercury compared to copper makes this leakage current relatively small. This leakage can be reduced by carrying the current out at a greater distance from the point at which it is led in. As shown in Fig. 7, the current is taken out at the second pole from that at which it is led in, so that the length of the leakage path from the leading-in to the leading-out conductor is doubled. With this arrangement the leakage is reduced so that a larger proportion of the total current flows through the armature-conductors, but the number of active conductors is reduced so that the total torque is less. To further reduce the leakage, two parallel paths for the current may be provided by dividing the current after it passes through the first conductor and carrying half of it around the armature in each direction, as shown in Fig. 8. With this arrangement there would be little leakage; but some of the conductors carry only one-half of the torque-producing current, so that the torque developed by them is considerably less.

The rotation of the moving element is retarded by the generation of eddy-currents in the insulated metallic ring 6. If desired, however, the ring 6 may be made of insulating material and the speed of rotation governed by the counter electromotive force developed instead of by the generation of eddy-currents.

Modifications of the arrangement of the parts other than those shown may be adopted, if desired. The homopolar field-magnet may be differently constructed and may be an electromagnet instead of a permanent one. All such modifications I consider within the scope of my invention, and I aim to cover them by the terms of the appended claims.

What I claim as new, and desire to secure by Letters Patent of the United States, is—

1. An electric meter comprising means for establishing a magnetic field, a plurality of conductors mounted for rotation therein, means including a bath of a conducting liquid in which said conductors are immersed for connecting two or more of the conductors in series, and means for registering the rotation of said conductors.

2. A mercury-meter comprising means for establishing a magnetic field, a moving element mounted for rotation therein, a plurality of conductors carried by the moving element, means including a bath of mercury in which the moving element is immersed for connecting two or more of said conductors in series, and a register actuated by the moving element.

3. An electric meter comprising a homopolar magnetic-field structure, a plurality of conductors mounted for rotation in the field thereof, means including a bath of a conducting liquid in which said conductors are immersed for connecting two or more of the conductors in series, and means for registering the rotations of said conductors.

4. An electric meter comprising means for establishing a magnetic field, a plurality of conductors mounted for movement therein, stationary conductors for connecting said conductors in series, a bath of a conducting liquid in which said movable conductors are immersed and which is arranged to connect the stationary and movable conductors, and means for registering the movements of the movable conductors.

5. A mercury-meter comprising a homopolar magnetic-field structure, a plurality of conductors mounted for movement therein, a stationary conductor for connecting said conductors in series, a bath of mercury in which said movable conductors are immersed and which is arranged to connect the stationary and movable conductors, and a register for the movements of the movable conductors.

6. An electric meter comprising means for establishing a magnetic field, a plurality of conductors mounted for rotation in said field, means including a conducting liquid making contact with said conductors for connecting two or more of them in series, means for retarding the rotation of the conductors, and a register driven by the conductors.

7. A mercury-meter comprising means for establishing a magnetic field, an insulated metallic movable element mounted for rotation therein, a plurality of conductors carried by the moving element, means including a bath of mercury making contact with the conductors for connecting two or more of them in series, and a register actuated by the moving element.

8. A mercury meter comprising a homopolar magnetic-field structure, a plurality of conductors mounted for rotation in the field thereof, means including a bath of mercury making contact with the conductors for connecting two or more of them in series, a damper for retarding the rotation of the conductors, and a register driven by the conductors.

9. In a mercury-meter, a magnet having a narrow chamber located in the field thereof, mercury in said chamber, a moving element rotatable in said chamber, a plurality of conductors carried by said element, and stationary conductors embedded in the walls of said chamber.

10. In a mercury-meter, means for establishing a magnetic field, a moving element rotatable therein, a bath of mercury in which said element is immersed, conductors carried thereby, and stationary conductors arranged to connect said conductors in series, said stationary conductors having their ends in close proximity to the path of movement of the moving conductors.

11. In a mercury-meter, means for establishing a magnetic field, a moving element rotatable therein, a bath of mercury in which the element is immersed, conductors carried thereby, and a stationary conductor arranged to connect said conductors in series, said movable and stationary conductors being completely insulated except at their ends.

12. In a mercury-meter, a magnet having a narrow chamber located in the field thereof the walls of which are of insulating material, mercury in said chamber, a movable element rotatable in said chamber, a plurality of conductors carried by said element, means for connecting said conductors in series, and means to lead current to and from said chamber.

13. In a mercury-meter, means for establishing a magnetic field, an insulated metallic supporting member mounted for rotation therein, a bath of mercury in which said member is immersed, conductors supported on said member, and means for connecting said conductors in series.

14. In an electric meter, means for establishing a magnetic field, a moving element rotatable therein, a bath of mercury in which the element is immersed, a plurality of conductors carried by said element, and means for connecting first one set and then another set of said conductors in series.

15. In an electric meter, means for establishing a magnetic field, a moving element rotatable therein, a plurality of conductors carried by said element, and means including a bath of mercury with which said conductors make contact for connecting first one set and then another set of the conductors in series with one another.

16. An electric meter comprising means for establishing a magnetic field, a plurality of conductors mounted for movement therein, a stationary conductor for connecting said conductors in series, a bath of a conducting liquid arranged to connect the stationary and movable conductors, means for retarding the movements of the movable conductors, and means for registering the movements of the movable conductors.

17. An electric meter comprising means for establishing a magnetic field, a plurality of armature-conductors mounted for rotation therein, means for registering the rotations of said conductors, means for causing current to flow through different groups of said conductors in series including a mercury-receptacle, mercury therein, and leads entering said receptacle to carry current to and from the mercury therein.

In witness whereof I have hereunto set my hand this 10th day of April, 1905.

FRANK HOLDEN.

Witnesses:
 H. D. JAMESON,
 A. NUTTING.